(12) United States Patent
Ku

(10) Patent No.: US 6,530,570 B2
(45) Date of Patent: Mar. 11, 2003

(54) HANDHELD CASE GRIPPER

(76) Inventor: Man To Ku, 1263 Oakglen Ave., Arcadia, CA (US) 91006

( * ) Notice: Subject to any disclaimer, the term of this patent is extended or adjusted under 35 U.S.C. 154(b) by 0 days.

(21) Appl. No.: 09/882,931

(22) Filed: Jun. 14, 2001

(65) Prior Publication Data

US 2002/0195771 A1 Dec. 26, 2002

(51) Int. Cl.[7] ................................................. A63F 71/00
(52) U.S. Cl. .................................................. 273/148 B
(58) Field of Search .................... 273/148 B; 463/36, 463/37, 38, 46, 47; D21/324, 332, 333; D14/454; 220/326

(56) References Cited

U.S. PATENT DOCUMENTS

| | | | | |
|---|---|---|---|---|
| 1,961,181 A | * | 6/1934 | von der Heydt | 206/269 |
| 4,573,682 A | * | 3/1986 | Mayon | 248/176.1 |
| 5,046,739 A | * | 9/1991 | Reichow | 273/148 B |
| D338,053 S | * | 8/1993 | Underhill et al. | D14/454 |
| 5,251,771 A | * | 10/1993 | Hotsumi et al. | 220/241 |
| 5,301,829 A | * | 4/1994 | Chrisco | 206/216 |
| 5,348,185 A | * | 9/1994 | Buckner et al. | 220/326 |
| D424,512 S | * | 5/2000 | Ho | D13/103 |
| 6,120,025 A | * | 9/2000 | Hughes, IV | 273/148 B |
| 6,241,247 B1 | * | 6/2001 | Sternberg et al. | 273/148 B |
| 6,315,142 B1 | * | 11/2001 | Kitamura et al. | 220/324 |

* cited by examiner

*Primary Examiner*—Raleigh W. Chiu
(74) *Attorney, Agent, or Firm*—Raymond Y. Chan; David and Raymond Patent Group

(57) ABSTRACT

A handheld case gripper is adapted for detachably attaching to an electronic game device, which includes a supporting holder having a receiving cavity for fittedly sitting the electronic game device thereon and two handle members extended from a bottom of the supporting holder. An interlocking arrangement includes at least a locking means frontwardly extended from a sidewall of the receiving cavity for interlocking with an engagement groove of the electronic game device, so as to securely lock up the electronic game device on the supporting holder of the handheld case gripper. Therefore, a player is able to firmly hold the electronic game device by holding the two handle members of the supporting holder within palms of the player's hands.

33 Claims, 7 Drawing Sheets

HANDHELD CASE GRIPPER

BACKGROUND OF THE PRESENT INVENTION

1. Field of Invention

The present invention relates to electronic game accessories, and more particularly to a handheld case gripper which is adapted for detachably attaching to an electronic game device, so as to enable a player to grip the electronic game device comfortably and operate the electronic game device more effectively.

2. Description of Related Arts

For years, entertainment companies have provided tons of electronic game such as television games and computer games, allowing people to play the games during their spare time. Especially a portable mini electronic game device, players are able to play the games anywhere.

The mini electronic game device generally comprises a case which contains electronic components therein having a top panel and a bottom panel, a screen provided on the top panel, a plurality of main control buttons provided on the top panel and two side control buttons operatively provided at two upper corners of the case, wherein a card slot is provided on top of the case for a game card selectively inserted thereto.

Due to the design of the mini electronic game device, the players normally use their thumbs to control the main control buttons and their index fingers to control the side control buttons. The rest of the supporting fingers are used to support underneath the case. In order to support the mini electronic game device in a stable manner, the players must use their fingers to grip the case. However, the mini electronic game device may easily be slip out of the player's hands by using six supporting fingers to support underneath the mini electronic game device, especially the player such as a young child who has a relative smaller size of hands. Thus, while playing game, the players tend to move their thumbs and index fingers, which may cause an unwanted movement of the mini electronic game device to slip out of the player's hands as well. Besides, the supporting fingers when gripped with the case of the mini electronic game device may affect the quick response movement of the thumbs and the index fingers, so that the players always feel uncomfortable and tired for a period of continued use. In worse, the improper gripping position may hurt the player's hand, especially the young child, permanently.

SUMMARY OF THE PRESENT INVENTION

A main object of the present invention is to provide a handheld case gripper for electronic game device, which is adapted for detachably attaching to an electronic game device by means of interlocking engagement so as to prevent an unwanted movement of the electronic game device when it is mounted on the handheld case gripper.

Another object of the present invention is to provide a handheld case gripper for electronic game device, which provide a better gripping support to a player such that the player can securely hold the electronic game device, so as to prevent the electronic game device from being slip of the player's hand accidentally.

Another object of the present invention is to provide a handheld case gripper for electronic game device, wherein the structural design of the handheld case gripper specifically fits for the players that can not only grip the electronic game device securely by the supporting fingers but also move the control fingers in a quick response manner.

Another object of the present invention is to provide a handheld case gripper for electronic game device, which comprises a rechargeable power supply for supplying power to the electronic game device. In other words, the electronic game device is adapted for selectively using both AC current and DC current so as to save the source of one-time usage battery for the electronic game device.

Another object of the present invention is to provide handheld case gripper which comprises a backup power supply for the electronic game device. The backup power supply is capable of storing a predetermined power capacity for supplying electrical power to the electronic game device, so as to prevent the electronic game device out of electrical power accidentally.

Accordingly, in order to accomplish the above objects, the present invention provides a handheld case gripper for detachably attaching to an electronic game device which comprises a case having a top panel and a bottom panel wherein an engagement groove is defined between the front panel and the back panel, and two side control buttons provided on two top corners of the case.

The handheld case gripper comprises a supporting holder having a receiving cavity for fittedly receiving the electronic game device therein and two handle members extended from a bottom of the supporting holder, and a pair of gripping supports rearwardly extended from the supporting holder. Whereby, the player is able to firmly hold the electronic game device by holding the two handle members of the supporting holder within palms of the player's hands and gripping the two gripping supports by two middle fingers of the player respectively.

The handheld case gripper further comprises an interlocking arrangement comprises at least a locking means frontwardly extended from a sidewall of the receiving cavity for interlocking with the engagement groove of the case, so as to securely lock up the case of the electronic game device on the supporting holder.

DETAILED DESCRIPTION OF THE PREFERRED EMBODIMENTS

Figure 1:
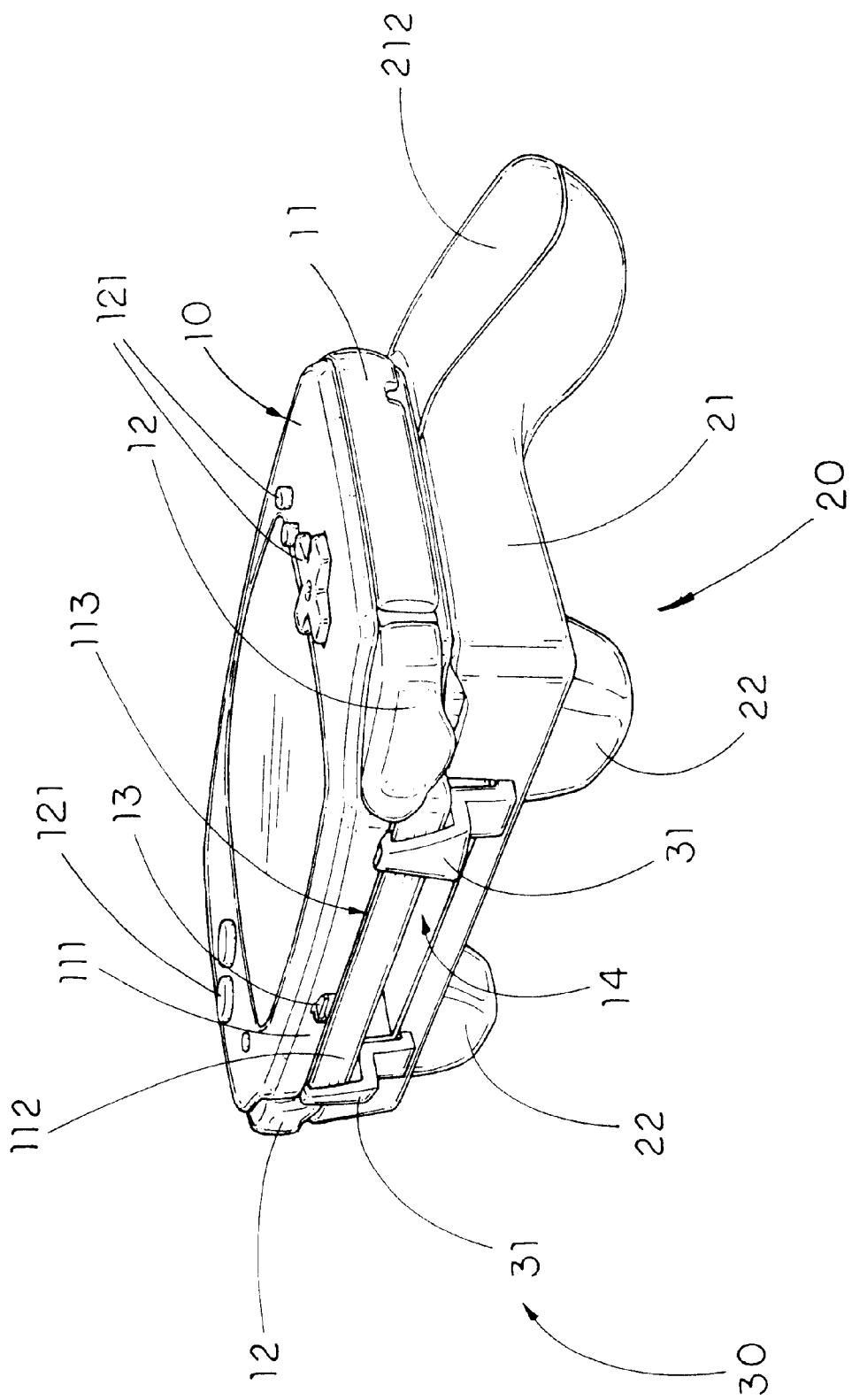
FIG. 1 is a perspective view of a handheld case gripper attached to an electronic game device according to a first preferred embodiment of the present invention.

Referring to FIG. 1 of the drawings, a handheld case gripper 20 adapted for detachably attaching to an electronic game device 10 according to a first preferred embodiment of the present invention is illustrated.

The electronic game device 10, as mentioned in the background, comprises a case 11 having a top panel 111 and a bottom panel 112 sealedly attached to the top panel 111 wherein an engagement groove 113 is defined between the connecting edges of the top panel 111 and the bottom panel 112 and extended around the case 11. The electronic game device 10 further comprises two side control buttons 12 and top control buttons 121 operatively provided on two top corners of the case 11 and the top panel 111 respectively, a plurality of device outlets 13 provided on sides of the case 11, a card slot 14 formed on a rear side of the case 11 for a game card to insert therein, and a battery compartment 15, having at least a conductive unit 151, for receiving batteries therein.

The handheld case gripper 20 comprises a supporting holder 21 having a receiving cavity 211 opened on top for fittedly receiving the electronic game device 10 therein and two handle members 212 frontwardly and downwardly extended from a front portion of the supporting holder 21, and a pair of gripping supports 22 downwardly extended from a rear portion of the supporting holder 21. Therefore, the player is able to firmly hold the electronic game device 10 by holding the two handle members 212 of the supporting holder 21 within palms of the player's hands and gripping the two gripping supports 22 by two middle fingers or index fingers of the player's two hands respectively.

The handheld case gripper 20 further comprises an interlocking arrangement 30 for holding the electronic game device 10 on top of the supporting holder 21 of the handheld case gripper 20. The interlocking arrangement 30 comprises at least a holder arm 31 integrally and upwardly extended from a rear sidewall of the receiving cavity 211 and a locking gripper 32 integrally and upwardly extended from a front side wall of the receiving cavity 211, so that the electronic game device 10 is firmly held in position between the holder arm 31 and the locking gripper 32 so as to securely grip the case of the electronic game device 10 on top of the supporting holder 21 of the handheld case gripper 32 while the bottom panel 112 sits in the receiving cavity 211.

According to the preferred embodiment of the present invention, there is a pair of holder arms 31 provided at two end portions of the rear sidewall of the receiving cavity 211, adapted for pressing against the rear side of the case 11 of the electronic game device 10 so as to prevent any rearwardly movement of the electronic game device 10. In which, the card slot 14 maintains opened to communicate with outside between the two holder arms 31. Moreover, with the two rear holder arms 31 biasing against the rear side of the case 11, the front locking gripper 32 is arranged to fittingly press against the front side of the case 11 for limiting any frontwardly movement of the electronic game device 10. Therefore, by engaging the two rear holder arms 31 and the front locking gripper 32 with the case 11, the electronic game device 10 is securely mounted on the handheld case gripper 20, so as to prevent any unwanted movement of the electronic game device 10 with respect to the handheld case gripper 20. as shown in FIG. 3A.

Figure 3A:
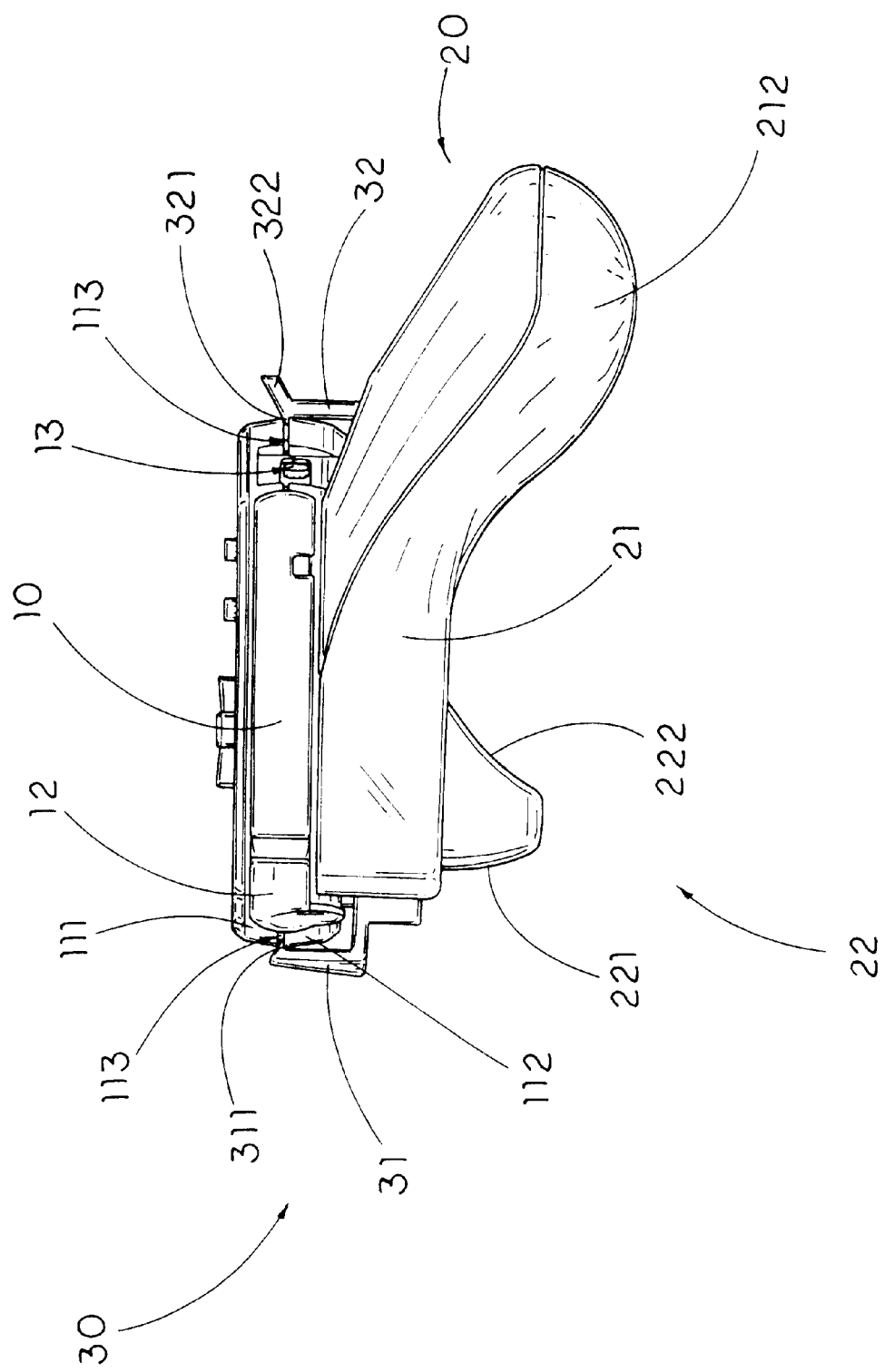
FIG. 3A is a side view of the handheld case gripper attached to the electronic game device according to the above first preferred embodiment of the present invention.

In order to securely lock up the case 11 of the electronic game device 20 on the supporting holder 21 of the handheld case gripper 20, at least the locking gripper 32 is arranged to interlock with the engagement groove 113 of the case 11, as shown in FIG. 3A. Moreover, the locking gripper 32, which has a predetermined width, is extended from a mid-portion of the supporting holder 21 and adapted for engaging with the engagement groove 113 at a central bottom portion of the case 11.

According to the first preferred embodiment of the present invention, the front locking gripper 32 is integrally extended from a front edge of the supporting holder 21 and a front locking ridge 321 is inwardly protruded from a top edge of the locking gripper 32 towards the rear holder arms 31. The thickness of the locking ridge 321 is slightly smaller than a width of the engagement groove 113 of the case 11. Therefore, when the locking gripper 32 presses on the front side of the case 11, the locking ridge 321 also fittingly engages into the engagement groove 113 of the case 10. By means of the engagement of the locking gripper 32 with the engagement groove 113 of the case 11, the case 11 is securely locked in position to prevent the case 11 of the electronic game device 10 from lifting up from the supporting holder 21.

According to the first preferred embodiment, each of the two rear holder arms 31 has an elastic ability and is integrally extended from a rear wall of the supporting holder 21, wherein each of the holder arms 31 also inwardly protrudes an engaging ridge 311 at a top edge thereof, wherein each of the engaging ridges 311 has a thickness slightly smaller than the width of the engagement groove 113, so that when the two holder arms 31 press on the rear side of the case 11, the engaging ridge 311 also fittingly engages into the engagement groove 113 of the case 10.

Figure 3B:
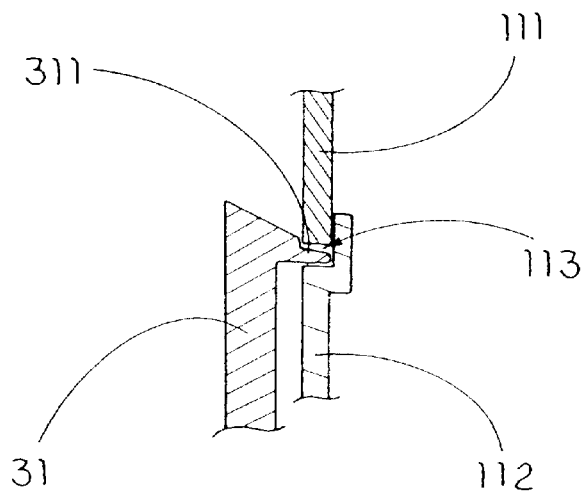
FIG. 3B is a partially sectional view of the handheld case gripper attached to the electronic game device according to the above first preferred embodiment of the present invention.

Accordingly, since both the holder arms 31 and the locking gripper 32 are engaged with case by inserting the engaging ridges 311 and the locking ridge 321 into the engagement groove 113, both the front side and the rear side of the case 11 are firmly gripped by the holder arms 31 and the locking gripper 32 to prevent any upwardly movement of the case 11 so as to securely mount the electronic game device 10 on the handheld case gripper 20 of the present invention, as shown in FIGS. 1, 3A and 3B.

The two holder arms 31 are spacedly extended from the supporting holder 21 wherein a distance between the two holder arms 31 is larger than a width of the card slot 14 in such a manner than the game card is adapted for inserting into the card slot 14 while the electronic game device 10 is mounted on the handheld case griper 20. In other words, each upper holder arm 31 is engaged with the case 11 at a position between the respective side control button 12 and the card slot 14 such that the handheld case gripper 20 will not disturb the operation of the electronic game device 10 when the electronic game device 10 is mounted on the handheld case gripper 20.

Furthermore, the front locking gripper 32 further comprises an operation lip 322 integrally and outwardly extended from the top edge of the locking gripper 32, so that the player may slightly pull the locking gripper 32 away from the holder arms 31 by pressing the operation lip 322 outwardly, so as to disengage the locking ridge 321 with the engagement groove 113 by pulling the locking ridge 321 out of the engagement groove 113 and increase the distance between the locking gripper 32 and the holder arms 31 so as that the player can detach the electronic game device 10 from the handheld case gripper 20.

Figure 2:
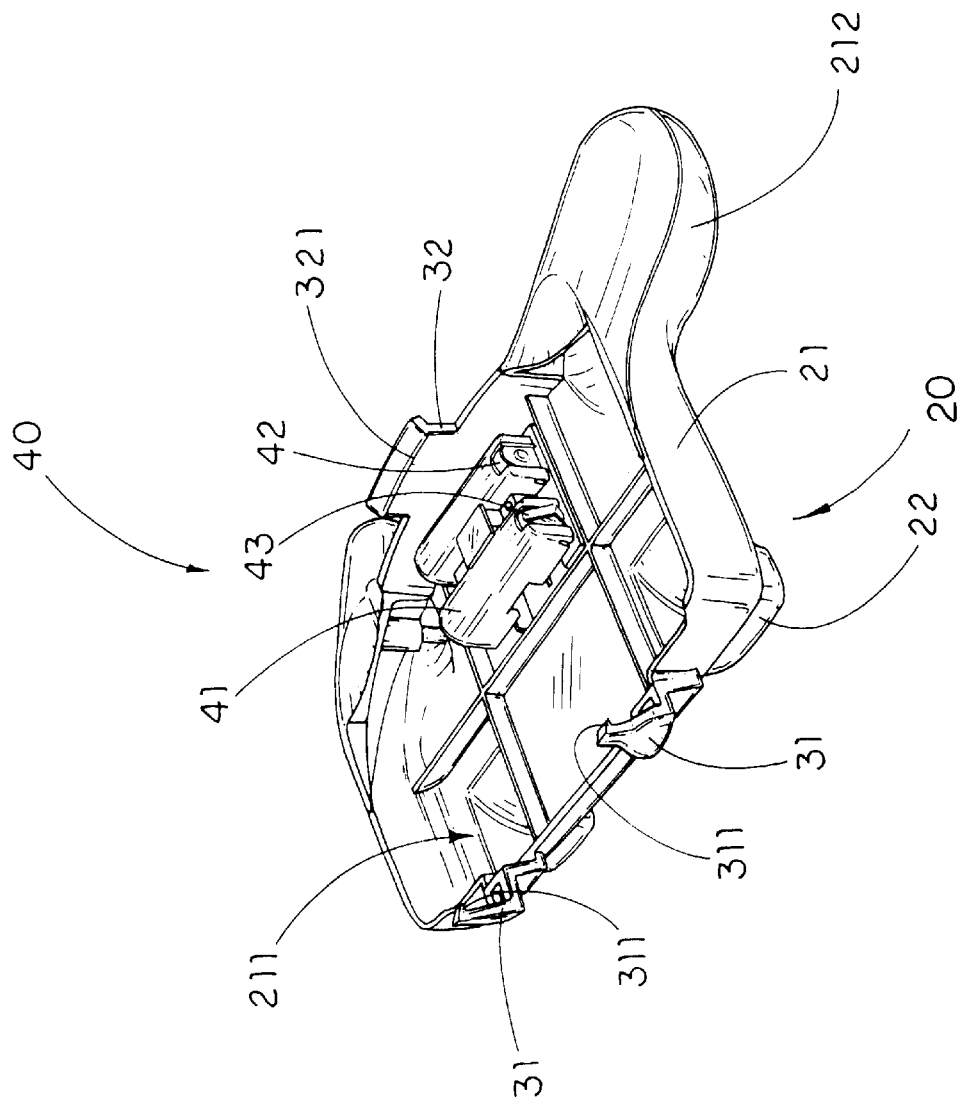
FIG. 2 is a perspective view of the handheld case gripper according to the above first preferred embodiment of the present invention.

As shown in FIG. 2, the receiving cavity 211 of the supporting holder 21 of the handheld case gripper 20 has a shape corresponding with a shape of the electronic game device 10 and a predetermined depth adapted for receiving at least a bottom portion of the case of the electronic game device 10, wherein the two side control buttons 12, the device outlets 13, and a card slot 14 are exposed to an exterior of the receiving cavity 211 when the electronic game device 10 is mounted on the handheld case gripper 20.

The two handle members 212 of the supporting holder 21 preferably has a bar-like shape adapted for being held by the palms of the player's hands respectively so as to firmly and comfortably hold the electronic game device 10 when it is mounted on the handheld case gripper 20. Accordingly, the supporting holder 21 is preferred made of lightweight but durable material such as plastic that can be mass-produced by molding techniques commonly known to those skilled in the art.

The two gripping supports 22 are spacedly and integrally projected from a rear portion of a bottom surface of the supporting holder 21, wherein the two gripping supports 22 are adapted for being gripped by the two middle fingers (or index fingers) of the player so as to hold the electronic game device 10 mounted on the handheld case gripper 20. Therefore, the player is able to securely hold the handheld case gripper 20 by locking up the two gripping supports 22 with the two middle fingers so as to prevent the handheld case gripper 20 from being slipped out of the player's hands.

In other words, the handheld case gripper 20 and the electronic game device 10 mounted thereon can be well supported by holding the two handle members 212 in palms and gripping the two gripping supports 22 with the middle fingers, so that the player's two index fingers and two thumbs of the player do not need to apply any force to support and hold the electronic game device 10 and are free to move for operating the side control buttons 12 and the top control buttons 121.

Moreover, each of the gripping supports 22 has a flat top surface 221 for the respective middle finger of the player to trigger at the gripping supports 22 so as to retain the secure gripping position of the supporting holder 21 within the player's hand. Each gripping support 22 has a curved bottom surface 222 for the respective middle finger to bias against the curved bottom surface 222 so as to hold the supporting holder 21 in position. For a player who has small size of hands, such as a young child, the player may not able to grip the flat top surface 221 of the gripping supports 22 such that the player may uses his or her middle fingers to bias against the curved bottom surfaces 222 of the gripping supports 22.

It is worth to mention again that in such gripping position, the player's thumbs and index fingers are free to move comfortably, which provides a better control while playing game than the ordinary gripping position for the electronic game device 10.

As shown in FIG. 2, the handheld case gripper 20 further comprises a rechargeable power supply 40 which includes a power housing 41 upwardly protruded from a bottom wall of the receiving cavity 211 and adapted for being fittedly disposed in the battery compartment 15 of the electronic game device 10 after a cover of the battery compartment 15 is removed, a power unit 42, such as battery, received in the power housing 41, and at least a terminal 43 for electrically connecting the power unit 42 with the conductive unit 151 so as to supply electrical power to the electronic game device 10.

Figure 4:
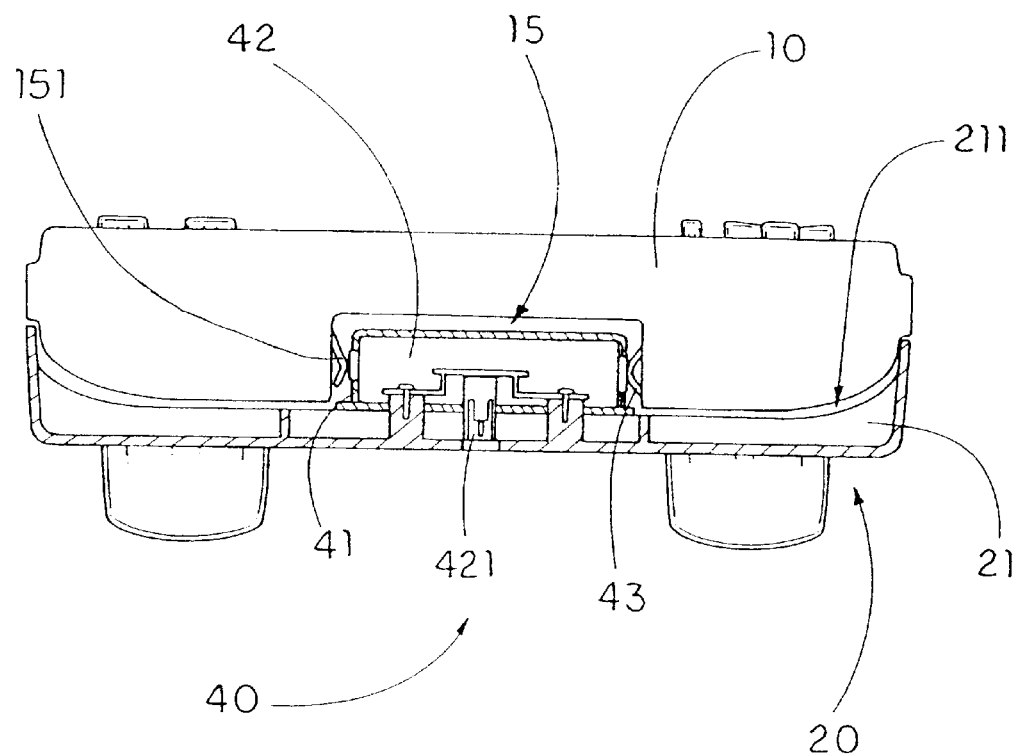
FIG. 4 is a section view of a rechargeable power supply of the handheld case gripper according to the above first preferred embodiment of the present invention.

As shown in FIG. 4, the power unit 42, according to a preferred embodiment, comprises at least a rechargeable battery disposed in the power housing 41 wherein the power unit 42 is adapted for recharging by an AC current via an input connector 421 provided on the bottom surface of the supporting holder 21 in such a manner that the power supply 40 is adapted for selectively supplying both AC current to the electronic game device 10 directly and DC current stored in the power unit 42. In other words, the player does not need to use the battery which is one-time use for the electronic game device 10, so as to save the source of battery.

The terminal 43 is mounted on the power housing 41 for electrically connecting the power unit 42 with the conductive unit 151 of the electronic game device 10 in such a manner the terminal 43 is biased against the conductive unit 151 in the battery compartment 15 when the electronic game device 10 is mounted on the handheld case gripper 20.

Figure 5:
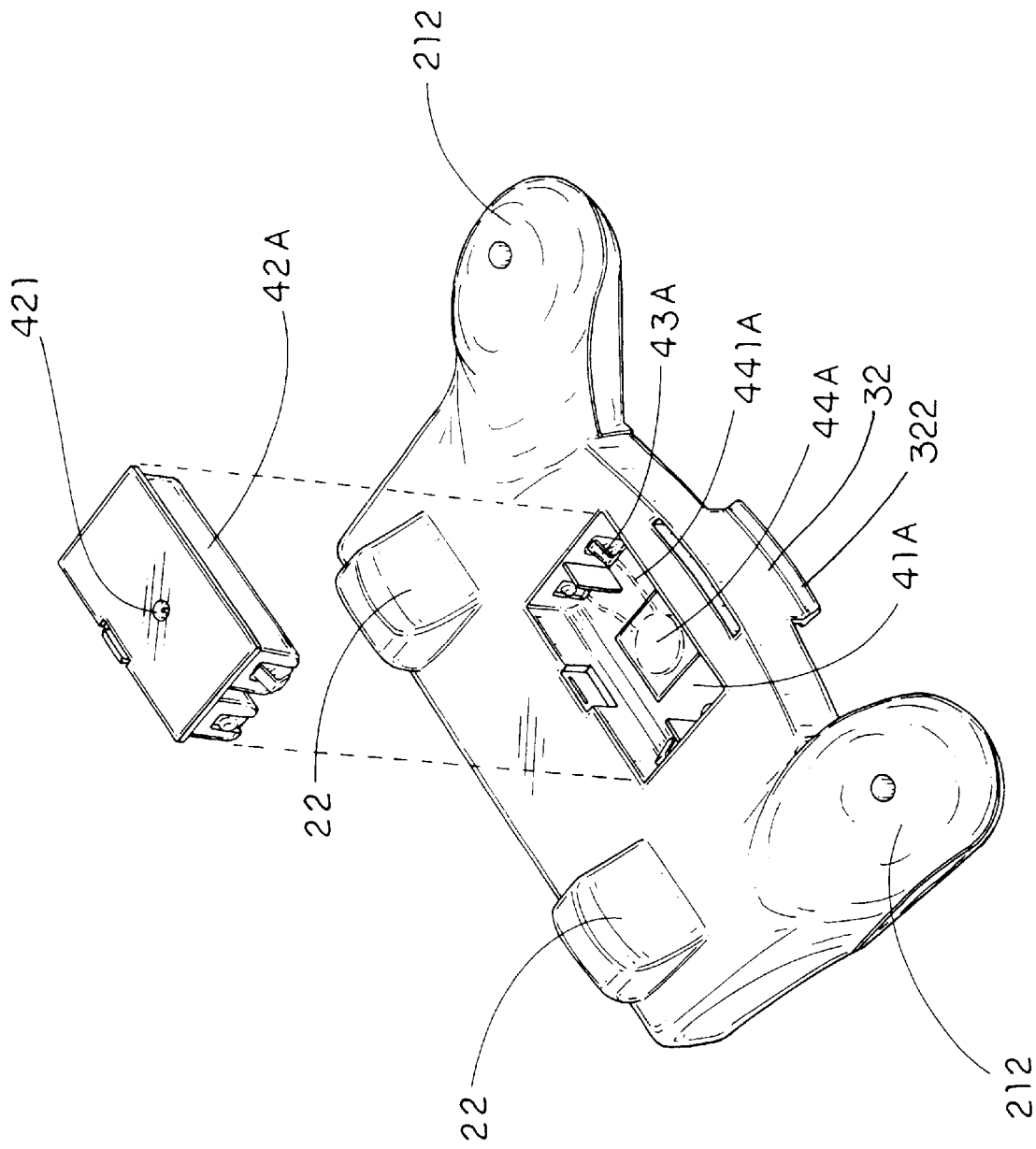
FIG. 5 illustrates an alternative mode of the rechargeable power supply of the handheld case gripper according to the above first preferred embodiment of the present invention.

FIG. 5 illustrates an alternative mode of the power supply 40A of the handheld case gripper 20A, wherein the power unit is a replaceable power unit 42A detachably attached to the power housing 41A. The power unit 42A is adapted for detaching from the power housing 41A in such a manner that the power unit 42A is capable of interchanging with another one when the power unit 42A is used up. In other words, when the power unit 42A uses up its electrical power, the player can change another power unit 42A in fully recharged manner for operating the electronic game device 10A continuously.

The power supply 40A further comprises a power backup device 44A, having a predetermined electricity capacity electrically connected to the terminal 43A wherein the power backup device 44A is adapted for supplying electrical power to the electronic game device 10A for a predetermined time when the power unit 42A is used up. The power backup device 44A comprises an auto switching means 441A for automatically switching an electrical connection between the power back device 44A and the power unit 42A with the electronic game device 10A in such a manner that when the power unit 42A is disposed in the power housing 41A, the electronic game device 10A is electrically connected to the power unit 42A, and when the power unit 42A is detached from the power housing 41A, the electronic game device 10A is automatically switched to electrically connect to the power backup device 44A. Therefore, the electronic game device 10A can be kept operating especially during interchanging the power unit 42A, so as to prevent data being lost when the power unit 42A is detached.

Figure 6:
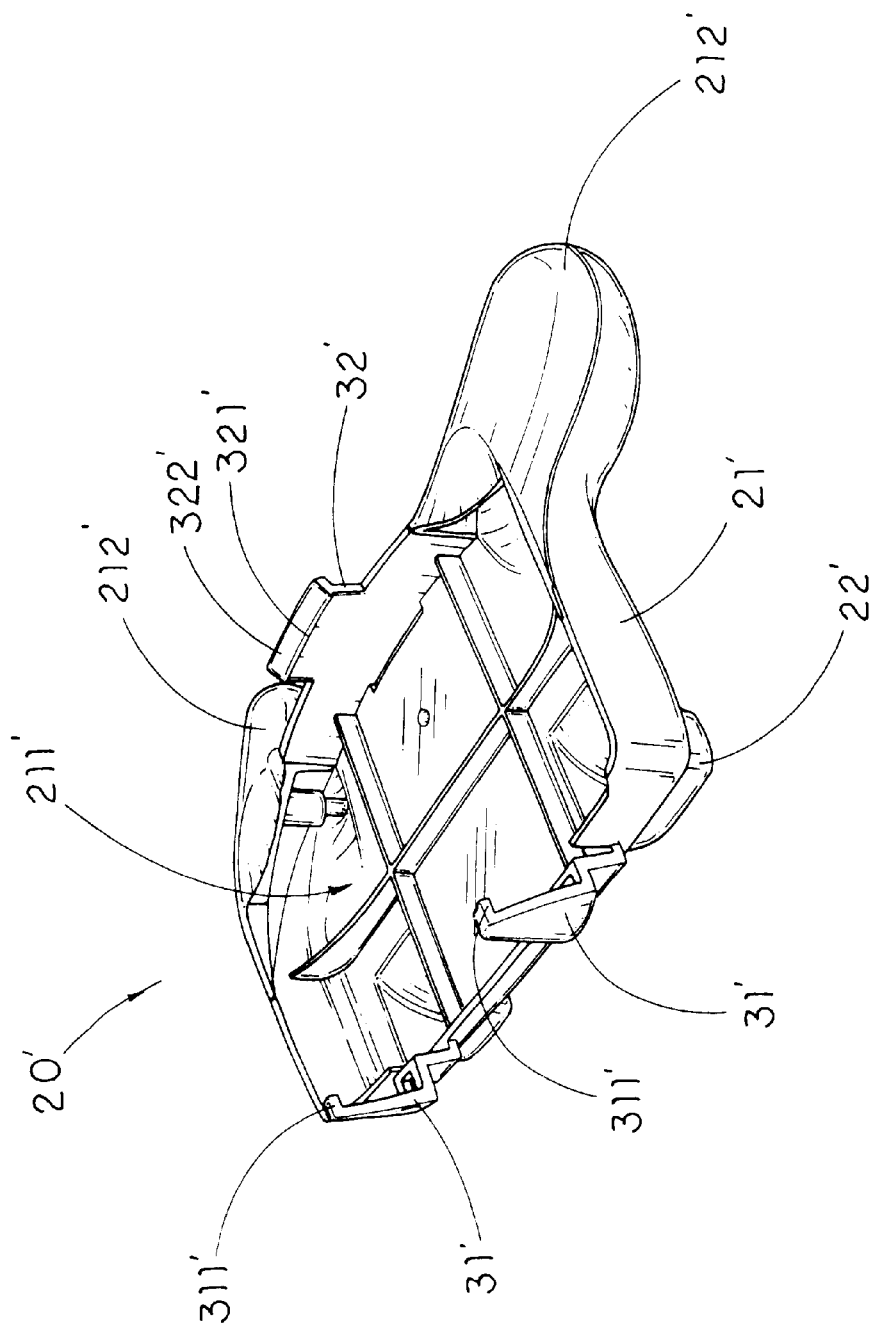
FIG. 6 is a perspective view of a handheld case gripper according to a second preferred embodiment of the present invention.
Figure 7:
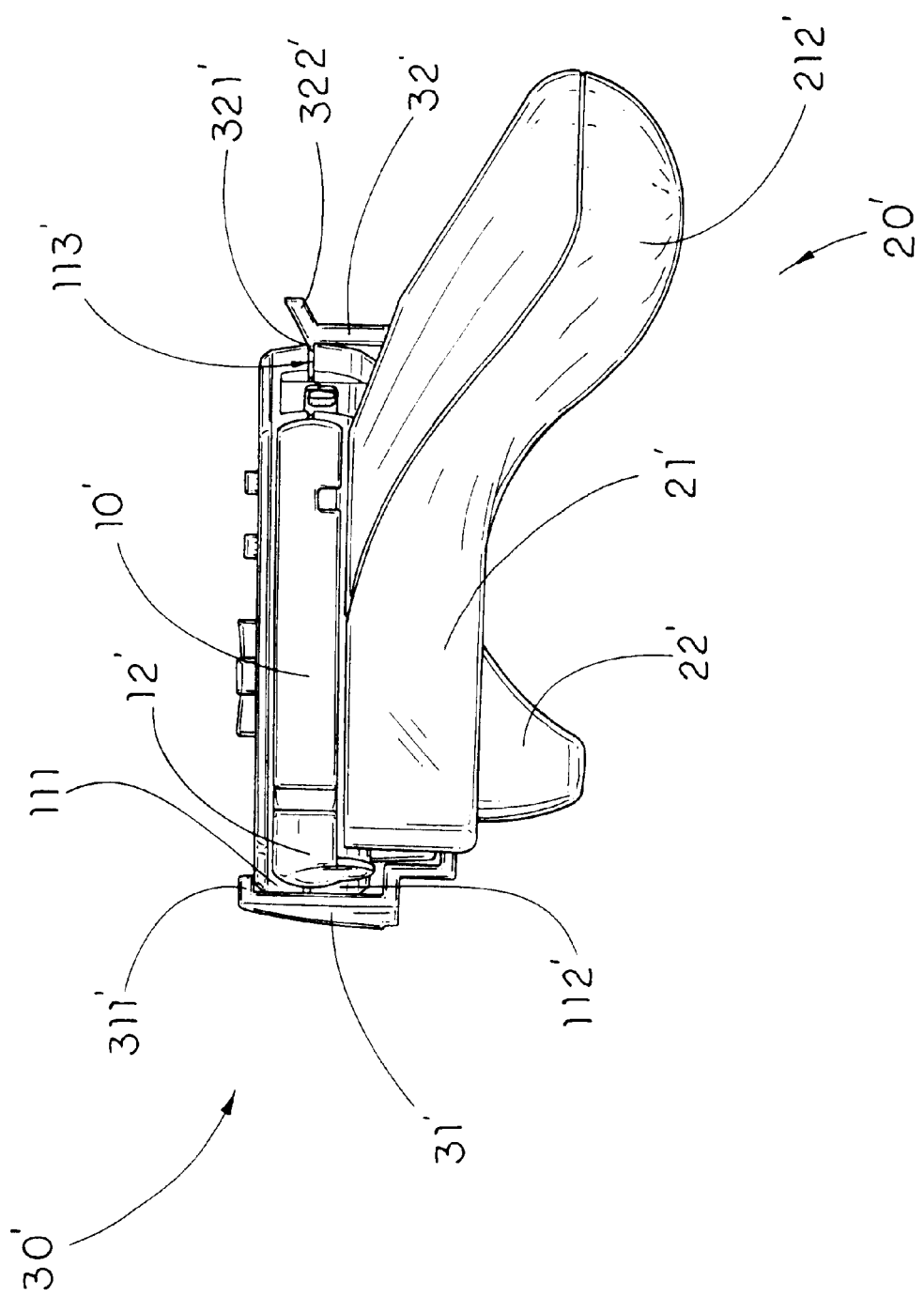
FIG. 7 is a side view of the handheld case gripper attached to the electronic game device according to the above second preferred embodiment of the present invention.

Referring to FIGS. 6 and 7 of the drawings, a second embodiment of the handheld case gripper 20' is illustrated, which is an alternative mode of the first embodiment of the present invention. As shown in FIG. 6, the handheld case gripper 20' of the second embodiment is mainly structured like the first embodiment as shown in FIGS. 1 to 5, except the two holder arms 31 which have two top engaging ridges 311 protruded thereon respectively in the first embodiment are substituted by the two rear holder arms 31', each having an elastic ability, which are integrally extended from a rear wall of the supporting holder 21' respectively and each alternatively provided with a top engaging lip 311' projected inwardly towards the locking gripper 32 for gripping against a top edge of the front panel 111 ' so as to securely engage with the case 111 and mount the electronic game device 10' on the handheld case gripper 20'.

Similar to the first embodiment, the front locking gripper 32' of the second embodiment is integrally extended from a front edge of the supporting holder 21' wherein the locking gripper 32' also has a top locking ridge 321' protruded thereon for fittedly engaging with the engagement groove 113' of the case 10'. Accordingly, the locker locking gripper 32' having a predetermined width is extended from a bottom mid-portion of the supporting holder 21' and adapted for engaging with the engagement groove 113' at a central bottom portion of the case 11'. Therefore, by engaging the two upper holder arms 31' and the lower locking gripper 32' with the case 11', the electronic game device 10' is securely mounted on the handheld case gripper 20' so as to prevent any unwanted movement of the electronic game device 10' with respect to the handheld case gripper 20', as shown in FIG. 7.

As shown in FIG. 6, apparently, the power supply 40 of the first embodiment can be eliminated in the second embodiment so as to further reduce the weight of the handheld case gripper 20'. Thus, the supporting holder 21' of the handheld case gripper 20' can be manufactured by molding techniques for mass production and in a low cost.

What is claimed is:

1. A handheld case gripper for detachably attaching to an electronic game device having a case, comprising:

a supporting holder having a receiving cavity for said electronic game device sitting therein and including at least a handle member extended from said supporting holder;

an interlocking arrangement for holding said electronic game device on top of said supporting holder, wherein said interlocking arrangement comprises at least a holder arm integrally and upwardly extended from a rear sidewall of said receiving cavity and a locking gripper integrally and upwardly extended from a front side wall of said receiving cavity, adapted for holding the electronic game device firmly in position between said holder arm and said locking gripper so as to securely grip the case of the electronic game device on top of said supporting holder of said handheld case gripper while the bottom panel sits in said receiving cavity; and a power supply which includes at least a power unit contained in said supporting holder, a power housing upwardly protruded from a bottom wall of said receiving cavity and adapted for being fittedly disposed in a battery compartment of the electronic game device, and at least a terminal providing on said power housing and electrically connecting with said power unit for supplying electrical power to the electronic game device.

2. The handheld case gripper, as recited in claim 1, wherein said power unit comprises at least a rechargeable battery wherein said power unit is adapted for recharging by an AC current via an input connector provided on said supporting holder in such a manner that said power supply is adapted for selectively supplying both said AC current to the electronic game device directly and said DC current stored in said power unit.

3. The handheld case gripper, as recited in claim 2, wherein said terminal is mounted on said power housing for electrically connecting said power unit with a conductive unit of said electronic game device adapted for biasing against the conductive unit in the battery compartment when the electronic game device is mounted on said handheld case gripper.

4. The handheld case gripper, as recited in claim 1, wherein said power unit, which is a replaceable power unit detachably attached to said power housing, is able to be detached from said power housing and replaced with a new power unit.

5. The handheld case gripper, as recited in claim 4, wherein said power supply further comprises a power backup device electrically connected to said terminal, wherein said power backup device comprises an auto switching means for automatically switching an electrical connection between said power back device and said power unit with the electronic game device in such a manner that when said power unit is disposed in said power housing, said electronic game device is electrically connected to said power unit, and when said power unit is detached from said power housing, the electronic game device is automatically switched to electrically connect to said power backup device.

6. A handheld case gripper for detachably attaching to an electronic game device having a case, comprising:

a supporting holder having a receiving cavity for said electronic game device sitting therein and including at least a handle member extended from said supporting holder;

an interlocking arrangement for holding said electronic game device on top of said supporting holder, wherein said interlocking arrangement comprises at least a holder arm integrally and upwardly extended from a rear sidewall of said receiving cavity and a locking gripper integrally and upwardly extended from a front side wall of said receiving cavity, adapted for holding the electronic game device firmly in position between said holder arm and said locking gripper so as to securely grip the case of the electronic game device on top of said supporting holder of said handheld case gripper while the bottom panel sits in said receiving cavity, wherein said locking gripper has a locking ridge inwardly protruded from said locking gripper towards said rear holder arm for interlocking with an engagement groove defined between a top panel and a bottom panel of the case of the handheld case gripper, wherein said locking ridge has a thickness slightly smaller than a width of the engagement groove of the case, whereby when said locking gripper presses on a front side of the case of the electronic game device, said locking ridge fittingly engages into the engagement groove of the case; and a power supply which includes at least a power unit contained in said supporting holder, a power housing upwardly protruded from a bottom wall of said receiving cavity and adapted for being fittedly disposed in a battery compartment of the electronic game device, and at least a terminal providing on said power housing and electrically connecting with said power unit for supplying electrical power to the electronic game device.

7. The handheld case gripper, as recited in claim 6, wherein said power unit comprises at least a rechargeable battery wherein said power unit is adapted for recharging by an AC current via an input connector provided on said supporting holder in such a manner that said power supply is adapted for selectively supplying both said AC current to the electronic game device directly and said DC current stored in said power unit.

8. The handheld case gripper, as recited in claim 7, wherein said terminal is mounted on said power housing for electrically connecting said power unit with a conductive unit of said electronic game device adapted for biasing against the conductive unit in the battery compartment when the electronic game device is mounted on said handheld case gripper.

9. The handheld case gripper, as recited in claim 6, wherein said power unit, which is a replaceable power unit detachably attached to said power housing, is able to be detached from said power housing and replaced with a new power unit.

10. The handheld case gripper, as recited in claim 9, wherein said power supply further comprises a power backup device electrically connected to said terminal, wherein said power backup device comprises an auto switching means for automatically switching an electrical connection between said power back device and said power unit with the electronic game device in such a manner that when said power unit is disposed in said power housing, said electronic game device is electrically connected to said power unit, and when said power unit is detached from said power housing, the electronic game device is automatically switched to electrically connect to said power backup device.

11. A handheld case gripper for detachably attaching to an electronic game device having a case, comprising:

a supporting holder having a receiving cavity for said electronic game device sitting therein and including at least a handle member extended from said supporting holder;

an interlocking arrangement for holding said electronic game device on top of said supporting holder, wherein said interlocking arrangement comprises at least a holder arm integrally and upwardly extended from a rear sidewall of said receiving cavity and a locking gripper integrally and upwardly extended from a front side wall of said receiving cavity, adapted for holding the electronic game device firmly in position between said holder arm and said locking gripper so as to securely grip the case of the electronic game device on top of said supporting holder of said handheld case gripper while the bottom panel sits in said receiving cavity, wherein said locking gripper has a locking ridge inwardly protruded from said locking gripper towards said rear holder arm for interlocking with an engagement groove defined between a top panel and a bottom panel of the case of the handheld case gripper, wherein said locking ridge has a thickness slightly smaller than a width of the engagement groove of the case, whereby when said locking gripper presses on a front side of the case of the electronic game device, said locking ridge fittingly engages into the engagement groove of the case, wherein said interlocking arrangement further comprises a second holder arm, wherein said two holder arms provided at two end portions of said rear sidewall of said receiving cavity, adapted for pressing against a rear side of the case of the electronic game device; and a power supply which includes at least a power unit contained in said supporting holder, a power housing upwardly protruded from a bottom wall of said receiving cavity and adapted for being fittedly disposed in a battery compartment of the electronic game device, and at least a terminal providing on said power housing and electrically connecting with said power unit for supplying electrical power to the electronic game device.

12. The handheld case gripper, as recited in claim 11, wherein said power unit comprises at least a rechargeable battery wherein said power unit is adapted for recharging by an AC current via an input connector provided on said supporting holder in such a manner that said power supply is adapted for selectively supplying both said AC current to the electronic game device directly and said DC current stored in said power unit.

13. The handheld case gripper, as recited in claim 12, wherein said terminal is mounted on said power housing for electrically connecting said power unit with a conductive unit of said electronic game device adapted for biasing against the conductive unit in the battery compartment when the electronic game device is mounted on said handheld case gripper.

14. The handheld case gripper, as recited in claim 11, wherein said power unit, which is a replaceable power unit detachably attached to said power housing, is able to be detached from said power housing and replaced with a new power unit.

15. The handheld case gripper, as recited in claim 14, wherein said power supply further comprises a power backup device electrically connected to said terminal, wherein said power backup device comprises an auto switching means for automatically switching an electrical connection between said power back device and said power unit with the electronic game device in such a manner that when said power unit is disposed in said power housing, said electronic game device is electrically connected to said power unit, and when said power unit is detached from said power housing, the electronic game device is automatically switched to electrically connect to said power backup device.

16. A handheld case gripper for detachably attaching to an electronic game device having a case, comprising:

a supporting holder having a receiving cavity for said electronic game device sitting therein and including at least a handle member extended from said supporting holder;

an interlocking arrangement for holding said electronic game device on top of said supporting holder, wherein said interlocking arrangement comprises at least a holder arm integrally and upwardly extended from a rear sidewall of said receiving cavity and a locking gripper integrally and upwardly extended from a front side wall of said receiving cavity, adapted for holding the electronic game device firmly in position between said holder arm and said locking gripper so as to securely grip the case of the electronic game device on top of said supporting holder of said handheld case gripper while the bottom panel sits in said receiving cavity, wherein said locking gripper has a locking ridge inwardly protruded from said locking gripper towards said rear holder arm for interlocking wit h an engagement groove defined between a top panel and a bottom panel of the case of the handheld case gripper, wherein said locking ridge has a thickness slightly smaller than a width of the engagement groove of the case, whereby when said locking gripper presses on a front si de of the case of the electronic game device, said locking ridge fittingly engages into the engagement groove of the case, wherein said interlocking arrangement further comprises a second holder arm, wherein said two holder arms provided at two end portions of said rear sidewall of said receiving cavity, adapted for pressing against a rear side of the case of the electronic game device, wherein said two holder arms are spacedly and integrally extended from a rear wall of said supporting holder and provided with a top engaging lip projected inwardly towards said locking gripper for gripping against a top edge of the front panel of the case so as to securely engage with said case and mount the electronic game device on said handheld case gripper; and a power supply which includes at least a power unit contained in said supporting holder, a power housing upwardly protruded from a bottom wall of said receiving cavity and adapted for being fittedly disposed in a battery compartment of the electronic game device, and at least a terminal providing on said power housing and electrically connecting with said power unit for supplying electrical power to the electronic game device.

17. The handheld case gripper, as recited in claim 16, wherein said power unit comprises at least a rechargeable battery wherein said power unit is adapted for recharging by an AC current via an input connector provided on said supporting holder in such a manner that said power supply is adapted for selectively supplying both said AC current to the electronic game device directly and said DC current stored in said power unit.

18. The handheld case gripper, as recited in claim 17, wherein said terminal is mounted on said power housing for electrically connecting said power unit with a conductive unit of said electronic game device adapted for biasing against the conductive unit in the battery compartment when the electronic game device is mounted on said handheld case gripper.

19. The handheld case gripper, as recited in claim 16, wherein said power unit, which is a replaceable power unit detachably attached to said power housing, is able to be detached from said power housing and replaced with a new power unit.

20. The handheld case gripper, as recited in claim 19, wherein said power supply further comprises a power backup device electrically connected to said terminal, wherein said power backup device comprises an auto switching means for automatically switching an electrical connection between said power back device and said power unit with the electronic game device in such a manner that when said power unit is disposed in said power housing, said electronic game device is electrically connected to said power unit, and when said power unit is detached from said power housing, the electronic game device is automatically switched to electrically connect to said power backup device.

21. A handheld case gripper for detachably attaching to an electronic game device having a case, comprising:
    a supporting holder having a receiving cavity for said electronic game device sitting therein and including at least a handle member extended from said supporting holder;
    an interlocking arrangement for holding said electronic game device on top of said supporting holder, wherein said interlocking arrangement comprises at least a holder arm integrally and upwardly extended from a rear sidewall of said receiving cavity and a locking gripper integrally and upwardly extended from a front side wall of said receiving cavity, adapted for holding the electronic game device firmly in position between said holder arm and said locking gripper so as to securely grip the case of the electronic game device on top of said supporting holder of said handheld case gripper while the bottom panel sits in said receiving cavity, wherein said locking gripper has a locking ridge inwardly protruded from said locking gripper towards said rear holder arm for interlocking with an engagement groove defined between a top panel and a bottom panel of the case of the handheld case gripper, wherein said locking ridge has a thickness slightly smaller than a width of the engagement groove of the case, whereby when said locking gripper presses on a front side of the case of the electronic game device, said locking ridge fittingly engages into the engagement groove of the case, wherein said interlocking arrangement further comprises a second holder arm, wherein said two holder arms provided at two end portions of said rear sidewall of said receiving cavity, adapted for pressing against a rear side of the case of the electronic game device, wherein each of said two rear holder arms is integrally extended from a rear wall of said supporting holder and inwardly protrudes an engaging ridge at a top edge thereof, wherein each of said engaging ridges has a thickness slightly smaller than a width of said engagement groove, thereby when said two holder arms press on said rear side of said case, said engaging ridges fittingly engage into the engagement groove of the case; and
    a power supply which includes at least a power unit contained in said supporting holder, a power housing upwardly protruded from a bottom wall of said receiving cavity and adapted for being fittedly disposed in a battery compartment of the electronic game device, and at least a terminal providing on said power housing and electrically connecting with said power unit for supplying electrical power to the electronic game device.

22. The handheld case gripper, as recited in claim 21, wherein said power unit comprises at least a rechargeable battery wherein said power unit is adapted for recharging by an AC current via an input connector provided on said supporting holder in such a manner that said power supply is adapted for selectively supplying both said AC current to the electronic game device directly and said DC current stored in said power unit.

23. The handheld case gripper, as recited in claim 22, wherein said terminal is mounted on said power housing for electrically connecting said power unit with a conductive unit of said electronic game device adapted for biasing against the conductive unit in the battery compartment when the electronic game device is mounted on said handheld case gripper.

24. The handheld case gripper, as recited in claim 21, wherein said power unit, which is a replaceable power unit detachably attached to said power housing, is able to be detached from said power housing and replaced with a new power unit.

25. The handheld case gripper, as recited in claim 24, wherein said power supply further comprises a power backup device electrically connected to said terminal, wherein said power backup device comprises an auto switching means for automatically switching an electrical connection between said power back device and said power unit with the electronic game device in such a manner that when said power unit is disposed in said power housing, said electronic game device is electrically connected to said power unit, and when said power unit is detached from said power housing, the electronic game device is automatically switched to electrically connect to said power backup device.

26. A handheld case gripper for detachably attaching to an electronic game device having a case, comprising:
    a supporting holder having a receiving cavity for said electronic game device sitting therein and including at least a handle member extended from said supporting holder, wherein said supporting holder further comprises a second handle member wherein each of said two handle members has a bar-like shape, and two gripping support spacedly and integrally projected from a rear portion of a bottom surface of said supporting holder, wherein each of said gripping supports has a flat top surface and a curved front surface;
    an interlocking arrangement for holding said electronic game device on top of said supporting holder, wherein said interlocking arrangement comprises at least a holder arm integrally and upwardly extended from a rear sidewall of said receiving cavity and a locking gripper integrally and upwardly extended from a front side wall of said receiving cavity, adapted for holding the electronic game device firmly in position between said holder arm and said locking gripper so as to securely grip the case of the electronic game device on top of said supporting holder of said handheld case gripper while the bottom panel sits in said receiving cavity, wherein said locking gripper has a locking ridge inwardly protruded from said locking gripper towards said rear holder arm for interlocking with an engagement groove defined between a top panel and a bottom panel of the case of the handheld case gripper, wherein said locking ridge has a thickness slightly smaller than a width of the engagement groove of the case, whereby when said locking gripper presses on a front side of the case of the electronic game device, said locking ridge fittingly engages into the engagement groove of the case, wherein said interlocking arrangement further comprises a second holder arm, wherein said two holder arms provided at two end portions of said rear sidewall of said receiving cavity, adapted for pressing against a rear side of the case of the electronic game device, wherein said two holder arms are spacedly and integrally extended from a rear wall of said supporting holder and provided with a top engaging lip projected inwardly towards said locking gripper for gripping against a top edge of the front panel of the case so as to securely engage with said case and mount the electronic game device on said handheld case gripper; and a power supply which includes at least a power unit contained in said supporting holder, a power housing upwardly protruded from a bottom wall of said receiving cavity and adapted for being fittedly disposed in a battery compartment of the electronic game device, and at least a terminal providing on said power housing and electrically connecting with said power unit for supplying electrical power to the electronic game device.

27. The handheld case gripper, as recited in claim 25, wherein said power unit comprises at least a rechargeable battery wherein said power unit is adapted for recharging by an AC current via an input connector provided on said supporting holder in such a manner that said power supply is adapted for selectively supplying both said AC current to the electronic game device directly and said DC current stored in said power unit.

28. The handheld case gripper, as recited in claim 27, wherein said terminal is mounted on said power housing for electrically connecting said power unit with a conductive unit of said electronic game device adapted for biasing against the conductive unit in the battery compartment when the electronic game device is mounted on said handheld case gripper.

29. The handheld case gripper, as recited in claim 26, wherein said power unit, which is a replaceable power unit detachably attached to said power housing, is able to be detached from said power housing and replaced with a new power unit.

30. The handheld case gripper, as recited in claim 29, wherein said power supply further comprises a power backup device electrically connected to said terminal, wherein said power backup device comprises an auto switching means for automatically switching an electrical connection between said power back device and said power unit with the electronic game device in such a manner that when said power unit is disposed in said power housing, said electronic game device is electrically connected to said power unit, and when said power unit is detached from said power housing, the electronic game device is automatically switched to electrically connect to said power backup device.

31. A handheld case gripper for detachably attaching to an electronic game device having a case, comprising:

a supporting holder having a receiving cavity for said electronic game device sitting therein and including at least a handle member extended from said supporting holder, wherein said supporting holder further comprises a second handle member wherein each of said two handle members has a bar-like shape, and two gripping support spacedly and integrally projected from a rear portion of a bottom surface of said supporting holder, wherein each of said gripping supports has a flat top surface and a curved front surface;

an interlocking arrangement for holding said electronic game device on top of said supporting holder, wherein said interlocking arrangement comprises at least a holder arm integrally and upwardly extended from a rear sidewall of said receiving cavity and a locking gripper integrally and upwardly extended from a front side wall of said receiving cavity, adapted for holding the electronic game device firmly in position between said holder arm and said locking gripper so as to securely grip the case of the electronic game device on top of said supporting holder of said handheld case gripper while the bottom panel sits in said receiving cavity, wherein said locking gripper has a locking ridge inwardly protruded from said locking gripper towards said rear holder arm for interlocking with an engagement groove defined between a top panel and a bottom panel of the case of the handheld case gripper, wherein said locking ridge has a thickness slightly smaller than a width of the engagement groove of the case, whereby when said locking gripper presses on a front side of the case of the electronic game device, said locking ridge fittingly engages into the engagement groove of the case. wherein said interlocking arrangement further comprises a second holder arm, wherein said two holder arms provided at two end portions of said rear sidewall of said receiving cavity, adapted for pressing against a rear side of the case of the electronic game device, wherein each of said two rear holder arms is integrally extended from a rear wall of said supporting holder and inwardly protrudes an engaging ridge at a top edge thereof, wherein each of said engaging ridges has a thickness slightly smaller than a width of said engagement groove, thereby when said two holder arms press on said rear side of said case, said engaging ridges fittingly engage into the engagement groove of the case; and a power supply which includes at least a power unit contained in said supporting holder, a power housing upwardly protruded from a bottom wall of said receiving cavity and adapted for being fittedly disposed in a battery compartment of the electronic game device, and at least a terminal providing on said power housing and electrically connecting with said power unit for supplying electrical power to the electronic game device.

32. The handheld case gripper, as recited in claim 31, wherein said power unit comprises at least a rechargeable battery wherein said power unit is adapted for recharging by an AC current via an input connector provided on said supporting holder in such a manner that said power supply is adapted for selectively supplying both said AC current to the electronic game device directly and said DC current stored in said power unit, wherein said terminal is mounted on said power housing for electrically connecting said power unit with a conductive unit of said electronic game device adapted for biasing against the conductive unit in the battery compartment when the electronic game device is mounted on said handheld case gripper.

33. The handheld case gripper, as recited in claim 31, wherein said power unit, which is a replaceable power unit detachably attached to said power housing, is able to be detached from said power housing and replaced with a new power unit.

* * * * *